United States Patent [19]

Eylon

[11] Patent Number: 5,378,549

[45] Date of Patent: Jan. 3, 1995

[54] POLARITY ADJUSTING BATTERY RECEPTOR

[76] Inventor: Dan Eylon, 10 Ben Yosef Ramat Aviv G, 69125 Tel Aviv, Israel

[21] Appl. No.: 100,852

[22] Filed: Aug. 2, 1993

[51] Int. Cl.⁶ .............................................. H01M 2/02
[52] U.S. Cl. .................................. 429/1; 429/7; 429/9; 429/96; 429/97; 429/100
[58] Field of Search ................ 429/1, 7, 9, 96, 97, 429/100

[56] References Cited

U.S. PATENT DOCUMENTS 3,984,257 10/1976 Zurcker .................................. 429/1
5,229,220 7/1993 Stanton et al. ......................... 429/1

FOREIGN PATENT DOCUMENTS 86709 5/1977 Australia .

Primary Examiner—Prince Willis, Jr.
Assistant Examiner—M. Nuzzolillo
Attorney, Agent, or Firm—Mark M. Friedman

[57] ABSTRACT

A battery receptor, or housing, capable of reversing its polarity to render operative an inserted battery regardless of the orientation of the inserted battery, which includes first and a second receptor electrical contacts and a polarity-reversing assembly which can bring about the reversal of the polarity of the contacts based on the difference in the physical configuration of the two ends of the inserted battery. Specifically, the battery receptor includes an electrically conductive retainer member which is rigidly connected to the receptor and which is in electrical contact with one of the receptor contacts. The retainer member is sized and shaped so as to retain the large diameter end of the battery but not the small diameter protrusion at the other end of the battery which is able to project through the plane of the retainer member and activate a switch which controls the polarity of the contacts.

13 Claims, 1 Drawing Sheet

POLARITY ADJUSTING BATTERY RECEPTOR

FIELD AND BACKGROUND OF THE INVENTION

The present invention relates to battery housings or receptors and, more particularly, to battery housings or receptors which are able to properly accommodate an inserted battery regardless of the polarity of the inserted battery.

A multitude of battery-operated devices and systems are in current use. Each device is operated by one or more batteries which must be inserted into a battery housing or receptor (hereinafter "receptor") which is typically, but not necessarily, integrally formed with the device. The batteries used may be of various voltages, sizes and shapes and may or may not be rechargeable.

Conventional battery receptors feature two contacts, one designed to electrically contact with the positive electrode of the battery while the other is designed to electrically contact the battery's negative electrode. In virtually all devices, the polarity is of crucial importance in the sense that the device will not operate unless the battery is properly inserted into the receptor, i.e., is inserted with such an orientation that each of the battery electrodes contacts the correct receptor contact. In certain devices, a reversal of the battery orientation can actually damage the device. To avoid such damage, some devices are equipped with suitable reverse-biased diodes which act as one-way valves to prevent flow of current in the wrong direction.

To help insure that the batteries are inserted in the proper orientation, the manufacturers of most battery-operated devices often provide a drawing or diagram, printed or embossed on, in, or in the vicinity of, the battery receptor, indicating the proper orientation in which the batteries should be inserted into the receptor. The intent is that the operator consult such drawings or diagrams prior to inserting the batteries.

Unfortunately, the drawings or diagrams are often ignored by the operator. In other cases, the drawings are difficult to read or interpret, especially in less than ideal lighting or when the operator is a child or a person of otherwise limited capacity to see, understand and/or implement the instructions implicit in the battery installation drawing or diagram. The problem is only compounded when two or more batteries must be inserted, often with different orientations, for example, to effect a series or parallel electrical connection between the batteries.

There is thus a widely recognized need for, and it would be highly advantageous to have, a device, or battery receptor, which will make it possible to install batteries into a battery-operated device without regard to their orientation and which will automatically adjust the polarities to render the installed battery operative.

SUMMARY OF THE INVENTION

According to the present invention, there is provided a battery receptor with reversible polarity to render operative an inserted battery regardless of the orientation of the inserted battery, comprising: (a) a first receptor electrical contact; (b) a second receptor electrical contact; and (c) a polarity-reversing assembly for reversing the polarity of the first and second receptor electrical contacts, the polarity-reversing assembly being in a first polarity condition when the battery is inserted in a first orientation and in a second polarity condition when the battery is inserted in a second orientation.

According to further features in preferred embodiments of the invention described below, the battery has physically dissimilar ends and the polarity-reversing assembly switches between the first polarity condition and the second polarity condition based on the physical dissimilarity of the ends of the battery.

According to still further features in the described preferred embodiments, the battery has a first end of a first dimension and a second end which is of a second dimension which is smaller than the first dimension, wherein the polarity-reversing assembly includes: (i) an electrically conductive retainer member rigidly connected to, or integrally formed with, the receptor, the retainer member being electrically conductive and in electrical contact with the first receptor electrical contact, the retainer member being sized and shaped to retain the first end of the battery but not the second end of the battery; and (ii) a switch effective in activating the switching between the first polarity condition and the second polarity condition, the switch being in a first position whenever the first end of the battery adjoins the first receptor electrical contact and being in a second position whenever the first end of the battery adjoins the second receptor electrical contact.

The present invention successfully addresses the shortcomings of the presently known configurations by providing a battery receptor, or housing, which is capable of reversing its polarity so as to render an inserted battery operative regardless of in which of two possible orientations the battery was actually inserted. A battery receptor according to the present invention includes a pair of electrical contacts and a polarity-reversing assembly which can bring about the reversal of the polarity of the contacts based on the difference in the physical configuration of the two ends of the inserted battery. Specifically, the battery receptor includes an electrically conductive retainer member which is rigidly connected to the receptor and which is in electrical contact with one of the receptor contacts and which is sized and shaped so as to retain the large diameter end of the battery but not the small diameter protrusion at the other end of the battery which, because of its size and shape, is able to project through the plane of the retainer member and activate a switch controlling the polarity of the contacts.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a device which can be incorporated into, or used in conjunction with, a battery receptor for the purpose of detecting the polarity of an inserted battery and adjusting the polarity of the receptor to accommodate the battery regardless of its polarity.

The principles and operation of a battery receptor according to the present invention may be better understood with reference to the drawings and the accompanying description.

Figure 1:
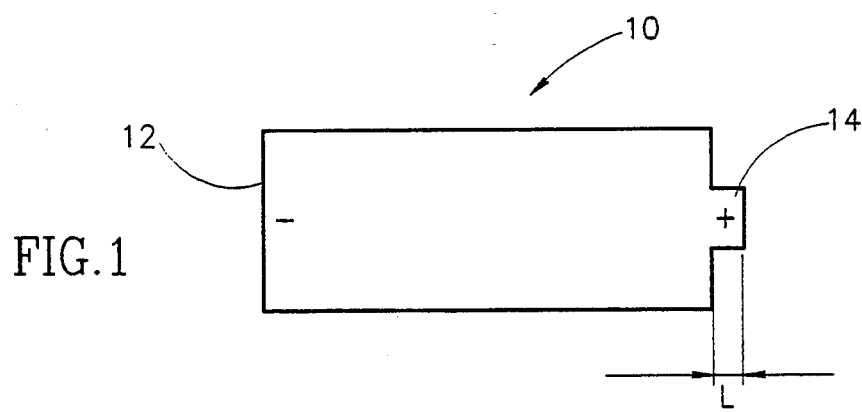
FIG. 1 is a schematic depiction of an ordinary battery which may be used with the present invention.

Referring now to the drawings, FIG. 1 illustrates in cross section a typical battery 10. A wide variety of battery shapes and sizes are in use. However, a very large fraction of currently available batteries are of the general shape shown in FIG. 1, i.e., the batteries are cylindrical with a first end 12 being of a first diameter, typically the same as the diameter of the battery body, and a second end 14 including a protrusion, typically cylindrical in shape, which projects axially from the battery body and which has a dimension, typically a diameter, which is significantly smaller than the diameter of first end 12.

Typically, but not always, first end 12 is connected to the negative electrode while second end 14 is connected to the positive electrode, as indicated in FIG. 1. It is to be noted that the present invention does not depend on the battery being of the specific shape or polarity shown in FIG. 1 and that other shapes and the opposite polarity convention can also be accommodated using devices according to the present invention, with appropriate changes, which will be readily apparent. For example, some 9 V batteries feature a pair of contacts, both of which are located at the same end of the battery, rather than being located at opposite ends, as in the battery depicted in FIG. 1.

The battery shape and polarity of FIG. 1, which is believed to be in most widespread use, was selected for illustrative purposes only and its use is not intended to in any way limit the scope of the present invention. Thus, for example, when reference is made throughout the specification and claims to an 'end' or to 'ends' of the battery, the intent is to designate a pole or the poles of the battery which are used to make electrical contact with the receptor, regardless of their precise location, so that, in some battery types, the 'ends' may, for example, be on the same side of the battery, or 90° apart and need not be diametrically opposed.

The adjustment of the polarity of the battery receptor may be effected in several ways. For example, the receptor could include a voltage-sensitive relay which reverses the polarity whenever necessary. Alternatively, a diode rectifier configuration could be used to accomplish the same goal. A disadvantage of both of these solutions is that they use a certain fraction of the available battery energy to operate, thereby reducing the overall power and useful life of the battery.

Figure 2:
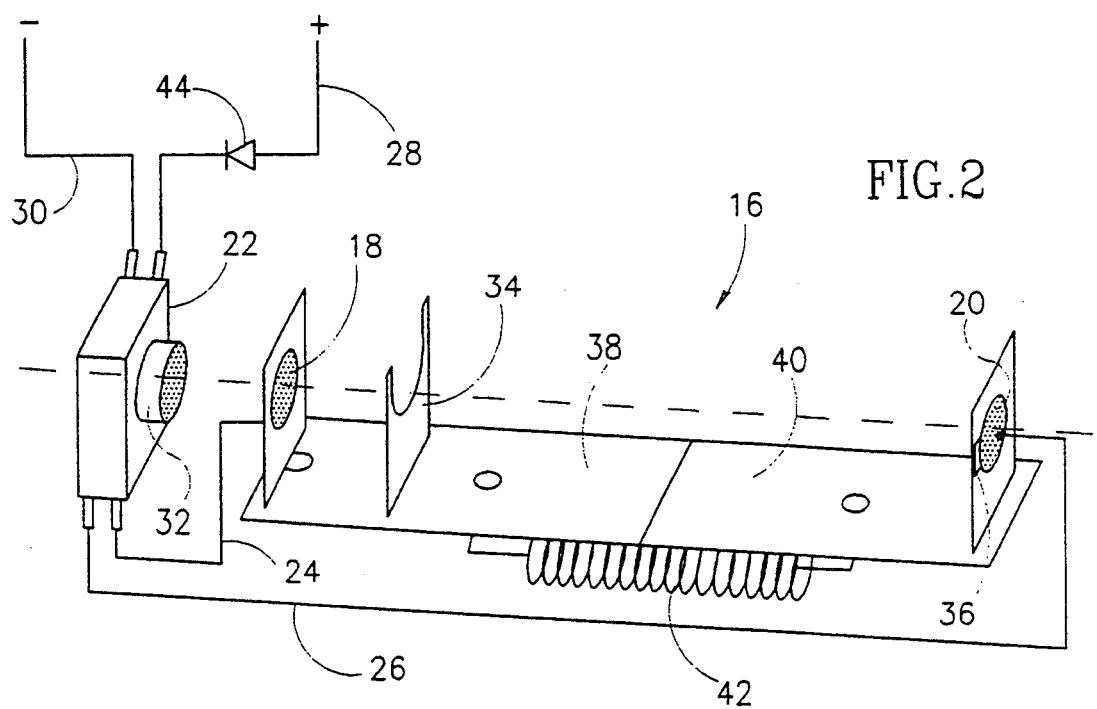
FIG. 2 is an exploded perspective view of one embodiment of a battery receptor according to the present invention.

Shown in FIG. 2 is a schematic exploded view of an illustrative battery receptor 16 according to a preferred embodiment of the present invention. Battery receptor 16 includes a pair of electrical contacts which, for purposes of exposition, will be referred to as first receptor electrical contact 18 and second receptor electrical contact 20. First receptor electrical contact 18 and second receptor electrical contact 20 are electrically connected to a suitable switching mechanism 22, preferably including a suitable microswitch, an example of which is described in more detail immediately below, through electrical leads 24 and 26, respectively.

Switching mechanism 22 has, as its output, a pair of electrical leads which supply electrical power to the battery-operated device, such as portable radio, and the like (not shown). Shown in FIG. 2 are the positive and negative output leads, 28 and 30, respectively from switching mechanism 22.

Switching mechanism 22 is designed to connect electrical leads 24 with 28 and electrical leads 26 with 30 or, alternatively, to connect electrical leads 24 with 30 and electrical leads 26 with 28. Thus, for example, when battery 10 is inserted into receptor 16 such that its positive end 14 touches contact 20, it is desirable that switching means 22 act to connect electrical lead 24 with 30 and electrical lead 26 with 28.

Figure 3:
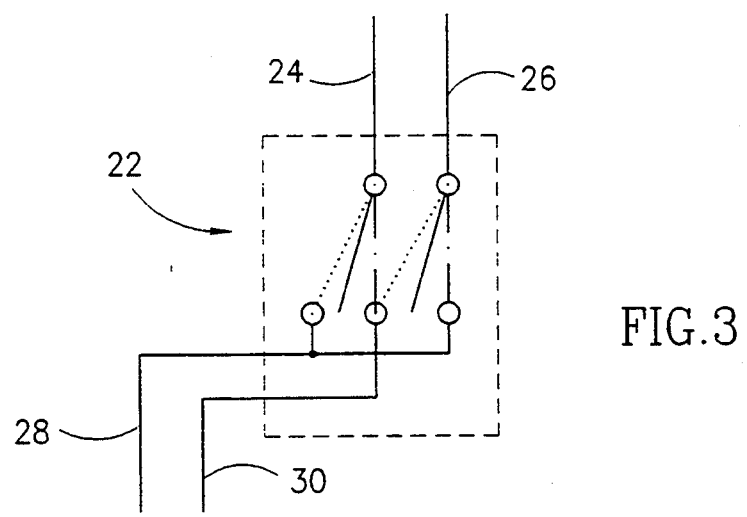
FIG. 3 is a schematic depiction of one example of a switching scheme which may be used as part of a device according to the present invention.

One illustrative type of switching means 22 is depicted in more detail in FIG. 3. Here, when switching means 22 is in one condition, indicated by the short-dashed lines, electrical contact is established between leads 24 and 28 and between leads 26 and 30. On the other hand, when switching means 22 is in a second condition, indicated by a line consisting of alternating short and long dashes, electrical contact is made between leads 24 and 30 and between leads 26 and 28.

Switching means 22 can be made to alternate between the two switching conditions by a variety of means, including, but not limited, the physical displacement of a mechanical switch 32 (FIG. 2), which is preferably mounted in the wall of battery receptor 16. Preferably, switch 32 is biased in one direction, preferably outwardly toward the right in FIG. 2, by a suitable biasing mechanism (not shown) such as a suitable spring. In this way, as long as switch 32 is not forced to the left, switching means 22 remains in one switching condition while, whenever switch 32 is forced to the left, switching means 22 is in the other switching condition.

Battery receptor 16 further includes a polarity-reversing assembly capable of reversing the polarity of receptor electrical contacts, 18 and 20, such that switching means 22 is in one of its conditions whenever battery 10 has been inserted in a first orientation, say, with positive end 14 toward the right, and in its other condition when battery 10 has been inserted in the opposite orientation, say, with positive end 14 toward the left.

The polarity-reversing assembly is designed to determine the condition of switching means 22 based on the physical dissimilarity of the ends of battery 10. Several methods of effecting this may be envisioned, a preferred embodiment is illustrated in FIG. 2 and is described next.

The polarity-reversing assembly includes an electrically conductive retainer member 34 which is rigidly connected to, anchored by, or integrally formed with receptor 16. Retainer member 34 is electrically conductive and is in electrical contact with first receptor electrical contact 18. It should be remembered that FIG. 2 is an exploded view which depicts retainer member 34, first receptor electrical contact 18 and switch 32 as being widely separated. In reality, the three components are immediately adjacent each other, preferably touching.

Retainer member 34 is sized and shaped to be capable, in the case of a battery having polarity as shown in FIG. 1, of retaining, i.e., axially contacting, the negative end 12 of battery 10 but not the positive end 14 of battery 10, whose distal end is able to penetrate the plane of retainer element 34.

Illustrative retainer element 34 shown in FIG. 2 features a cutout which is dimensioned to allow positive end 14, but not negative end 12, of battery 10 to pass through the imaginary plane of retainer element 34.

Thus, whenever battery 10 is installed with positive end 14 to the right, retainer member 34 retains, or axially contacts, the outermost portion of negative end 12 of battery 10, preventing negative end 12 from depressing switch 32 which is outwardly biased, while serving as an electrical contact between negative end 12 of battery 10 and contact 18. Switching means 22 is designed such that when switch 32 is not depressed, lead 24 is connected to lead 30 and lead 26 is connected to lead 28.

By contrast, after battery 10 is installed with positive end 14 to the left, retainer member 34, because of the physical dimensions of retainer member 34 and of positive end 14 of battery 10, is not able to retain, or axially contact, positive end 14 of battery 10. As a result, positive end 14 of battery 10 is able to make direct electrical contact with contact 18 and is further able to depress outwardly-biased switch 32. Switching means 22 is designed such that whenever switch 32 is depressed, lead 24 is connected to lead 28 and lead 26 is connected to lead 30.

In this way, a system according to the present invention is able to ensure that battery 10 will be operative regardless of its orientation within receptor 16.

Preferably, a receptor 16 further includes a second switch 36, which may be similar in construction to switch 32. Second switch 36 is associated with second receptor electrical contact 20 and its function is to electrically enable second receptor contact 20 only when second switch 36 is being depressed by either positive end 14 or negative end 12 of battery 10. Second switch 36 thus serves to eliminate spurious polarity reversals during the period in which battery 10 is actually being installed into receptor 16, enabling the flow of current only when there is simultaneously electrical contact at first housing electrical contact 18 and second switch 36 is being depressed by one or the other of the ends of battery 10.

Preferably also, first and second receptor electrical contacts, 18 and 20 are biased toward each other to ensure proper electrical contacts and so as to be able to better accommodate batteries 10 of slightly differing lengths.

The biasing can be accomplished in a variety of ways. For example, one or the other of receptor electrical contacts 18 and 20 could be mounted on a support element, 38 and/or 40, which is, or are, movable with respect to the other contact or with respect to each other. The actual biasing may be achieved by connecting the one or more support elements 38 and/or 40 with the aid of a suitable spring 42 or similar mechanisms.

Preferably, lead 28 and/or lead 30 includes a suitably oriented reverse-biased diode to prevent damage to the battery-operated device in the event that, despite the presence of the polarity adjusting system according to the present invention, current attempts to flow to the battery-operated device in the wrong direction.

While the invention has been described with respect to a limited number of embodiments, it will be appreciated that many variations, modifications and other applications of the invention may be made.

What is claimed is:

1. A battery receptor with reversible polarity to render operative a battery connected to the receptor regardless of the orientation of the inserted battery, comprising:

(a) a first receptor electrical contact;
   (b) a second receptor electrical contact; and
   (c) a polarity-reversing assembly electrically connected to said first and second receptor electrical contacts for reversing the polarity of said first and second receptor electrical contacts, said polarity-reversing assembly being in a first polarity condition when the battery is inserted in a first orientation and in a second polarity condition when the battery is inserted in a second orientation.

2. A battery receptor as in claim 1, wherein said battery has physically dissimilar ends and said polarity-reversing assembly switches between said first polarity condition and said second polarity condition based on the physical dissimilarity of the ends of the battery.

3. A battery receptor as in claim 2, wherein said battery has a first end of a first dimension and a second end which is of a second dimension which is smaller than said first dimension, wherein said polarity-reversing assembly includes:

(i) an electrically conductive retainer member, said retainer member being electrically conductive and in electrical contact with said first receptor electrical contact, said retainer member being sized and shaped to retain the first end of the battery but not the second end of the battery; and
   (ii) a polarity-reversing switch effective in activating the switching between said first polarity condition and said second polarity condition, said polarity-reversing switch being in a first position whenever the first end of the battery adjoins said first receptor electrical contact and being in a second position whenever the first end of the battery adjoins said second receptor electrical contact.

4. A battery receptor as in claim 3, wherein said polarity-reversing switch adjoins said first receptor electrical contact.

5. A battery receptor as in claim 3, further comprising a second switch, said second switch adjoining said second receptor electrical contact and serving to electrically enable said second receptor contact only when said second switch is being contacted by either end of the battery.

6. A battery receptor as in claim 3, wherein said polarity-reversing switch is biased in one direction.

7. A battery receptor as in claim 3, wherein said polarity-reversing switch is a microswitch.

8. A battery receptor as in claim 3, wherein the battery has a first end of a first diameter and a second end which features an axially extending centrally located protrusion of a second dimension which is smaller than said first diameter, wherein said retainer member is shaped so as to axially contact the first end but not the second end of the battery.

9. A battery receptor as in claim 8, wherein said retainer element is formed with a cutout sized to allow the protrusion to penetrate the plane of said retainer element.

10. A battery receptor as in claim 2, wherein said first and said second receptor electrical contacts are biased toward each other.

11. A battery receptor as in claim 10, wherein at least one of said receptor electrical contacts is mounted on a support element which is movable with respect to said other receptor electrical contact.

12. A battery receptor as in claim 11, wherein said biasing is effected through the use of a spring mechanism connected to said support element.

13. A battery receptor as in claim 2, further comprising at least one reverse-biased diode connected so as to prevent the flow of current in an undesirable direction.

* * * * *